United States Patent Office.

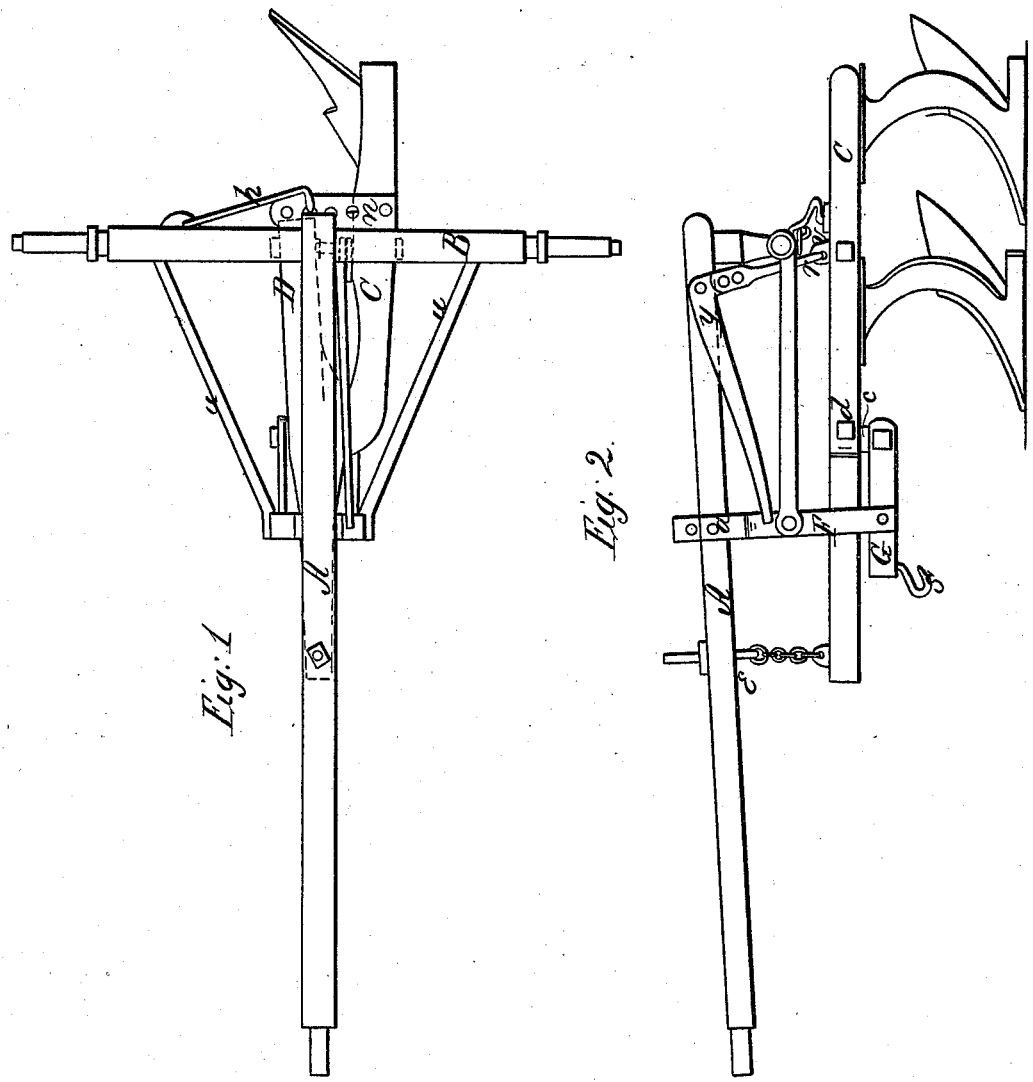

GEORGE SEIBERT AND JOHN SEIBERT, OF ASHLEY, ILLINOIS.

Letters Patent No. 89,797, dated May 4, 1869.

---

IMPROVEMENT IN GANG-PLOW.

---

The Schedule referred to in these Letters Patent and making part of the same.

---

*To all whom it may concern:*

Be it known that we, GEORGE SEIBERT and JOHN SEIBERT, of Ashley, in the county of Washington, and State of Illinois, have invented a new and valuable Improvement in Gang-Plows; and we do hereby declare that the following is a full, clear, and exact description of the construction and operation of the same, reference being had to the annexed drawings making a part of this specification, and to the letters and figures of reference marked thereon.

Figure 1 of the drawings is a top view of our device; and

Figure 2 is a side view of the same.

Our invention has relation to the manufacture of plows, and it consists mainly in the construction and arrangement of novel means for regulating track of the plows and the depth of furrow to be cut.

The letter A of the drawings represents the main beam, and letter B the axle of a two-wheeled carriage.

Underneath these devices the gang of plows is swung, and operated as hereinafter mentioned, or a single plow may be attached thereto at will.

The letters C and D are beams to which the plows are attached, as shown on fig. 2, the front end of beam D being connected with beam A by a chain, bolt, and screw, as shown at E on said figure, the office of which is to enable the operator to raise or lower the beam C by turning the nut on said threaded bolt.

The letter F is a staple attached to the beam A, as shown, and made adjustable therein by means of holes and bolt, as shown at *a*.

This staple is formed of two pieces of iron, duplicate in size and form, and placed one on each side of the beam A, and extending downwards, as shown on fig. 2.

To the lower ends of these bars, thus forming the staple F, we affix the staple G by bolting the two firmly together as represented.

The rear end of staple G is pivoted to flanches *c*, which extend downward from the plow-beam, as shown at the point *d*.

The letter *s* is a draught-hook attached to the front end of staple G.

The letters *u* are braces, extending from the axle to the staple F.

To the bolt in the rear that passes through and unites the beams C and D, we attach a small pivoted arm, *v*, and to the upper end of this arm is affixed the rod *r*, the upper end of which is perforated with holes to receive the pin that unites it to the lower end or shank of elbow-lever *y*.

The arrangement and combination of these last-named devices enable the operator to raise or lower the plows at will.

On the lower side of the carriage-axle, at the point indicated, we affix a hook, marked *h* on the drawings, and upon the upper surface of beams C and D we attach the perforated bar *n*.

This last-named hook and bar enable the operator to adjust the position of the plows, and regulate their track landward or otherwise, as he may desire.

What we claim as our invention, and desire to secure by Letters Patent, is—

1. The staples F and G, when arranged and operating substantially as and for the purposes described.

2. The hook *h* and perforated bar *n*, when combined with the plow herein described, and operating as and for the purposes mentioned.

In testimony that we claim the above, we have hereunto subscribed our names, in the presence of two witnesses.

GEORGE SEIBERT.
JOHN SEIBERT.

Witnesses:
JOHN H. FERGUSON,
ADAM HOEFLE.